United States Patent [19]

Ishimori

[11] Patent Number: 4,631,980
[45] Date of Patent: Dec. 30, 1986

[54] HYDRAULIC CIRCUIT CONSTRUCTION FOR A TRACTOR HAVING A HYDRAULIC STEPLESS CHANGE SPEED APPARATUS

[75] Inventor: Shozo Ishimori, Sakai, Japan
[73] Assignee: Kubota, Ltd., Osaka, Japan
[21] Appl. No.: 552,034
[22] PCT Filed: Mar. 8, 1983
[86] PCT No.: PCT/JP83/00071
 § 371 Date: Nov. 7, 1983
 § 102(e) Date: Nov. 7, 1983
[87] PCT Pub. No.: WO83/03127
 PCT Pub. Date: Sep. 15, 1983

[30] Foreign Application Priority Data

Mar. 9, 1982 [JP] Japan .................................. 57-33478

[51] Int. Cl.[4] .............................................. F16H 47/00
[52] U.S. Cl. ....................................... 74/730; 74/718
[58] Field of Search ................. 74/730, 732, 718, 733,
 74/867, 687, 745; 180/336; 60/422; 91/516;
 172/812

[56] References Cited

U.S. PATENT DOCUMENTS

| | | | |
|---|---|---|---|
| 3,272,280 | 9/1966 | Schuetz | 180/336 |
| 3,535,877 | 10/1970 | Becker et al. | 60/422 |
| 3,597,921 | 8/1971 | McBurnett | 60/422 |
| 3,750,405 | 8/1973 | Lech | 60/422 |
| 3,875,747 | 4/1975 | Briggs | 60/422 |
| 3,922,931 | 12/1975 | Osujyo | 74/687 |
| 4,070,857 | 1/1978 | Wible | 60/422 |
| 4,314,619 | 2/1982 | Tsuji | 180/336 |
| 4,321,793 | 3/1982 | Uranaka et al. | 60/422 |
| 4,341,133 | 7/1982 | Sakamoto | 74/733 |
| 4,343,151 | 8/1982 | Lorimor | 60/422 |
| 4,352,398 | 10/1982 | Schantz | 172/812 |
| 4,449,365 | 5/1984 | Hancock | 60/422 |
| 4,480,502 | 11/1984 | Nembach | 74/733 |

FOREIGN PATENT DOCUMENTS

| | | | |
|---|---|---|---|
| 2452835 | 5/1975 | Fed. Rep. of Germany | 74/730 |
| 2357282 | 5/1975 | Fed. Rep. of Germany | 74/730 |
| 2301741 | 9/1976 | France | 74/730 |
| 45-39569 | 12/1970 | Japan . | |
| 48-98538 | 12/1973 | Japan . | |
| 0024958 | 3/1978 | Japan | 74/867 |

*Primary Examiner*—Allan D. Herrmann
*Assistant Examiner*—David Novais
*Attorney, Agent, or Firm*—Kane, Dalsimer, Kane, Sullivan and Kurucz

[57] ABSTRACT

A hydraulic circuit construction for a tractor having a hydraulic stepless change speed apparatus wherein pressure oil is supplied to the charge oil line regardless of whether the main clutch is engaged or disengaged while the engine is running. Furthermore, where the lift arm cylinder is the single acting type, the pressure oil from the hydraulic pump directly connected to the engine is divided at a flow priority valve, its excess flow being supplied to the hydraulic circuit for driving the lift arm cylinder, into a return oil line from this circuit a control flow of the flow priority valve being joined, whereby at least a constant amount of control flow is supplied to the charge oil line to avoid a complete break of the charge oil supply even if there is no flow of pressure oil in the return oil line at times of pressure oil supply to the single acting lift arm cylinder.

5 Claims, 11 Drawing Figures

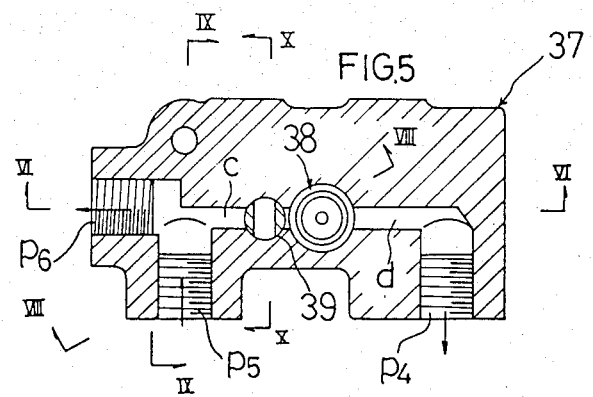
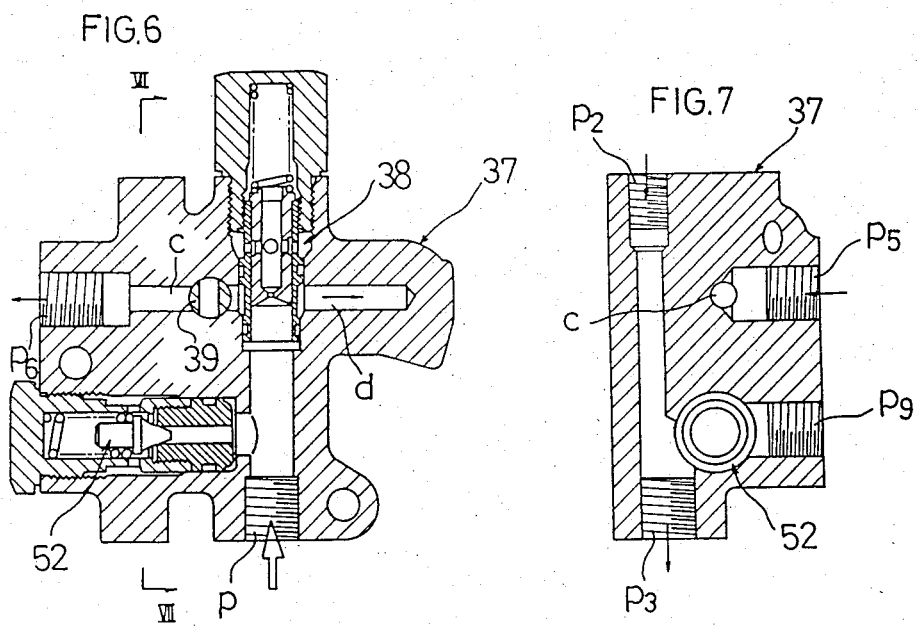
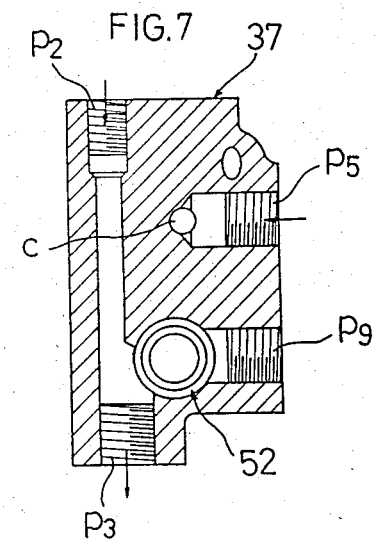
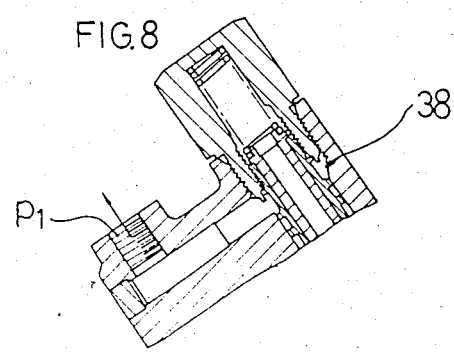

HYDRAULIC CIRCUIT CONSTRUCTION FOR A TRACTOR HAVING A HYDRAULIC STEPLESS CHANGE SPEED APPARATUS

DESCRIPTION

TECHNICAL FIELD

This invention relates to a hydraulic circuit construction for a tractor having a hydraulic stepless change speed apparatus wherein output of an engine is transmitted through a main clutch to the hydraulic stepless change speed apparatus, a change output of this change speed apparatus being transmitted to a gear transmission for traveling, the engine output having passed the main clutch is transmittable also to a PTO shaft for actuating an attached working implement without passing through the hydraulic stepless change speed apparatus, and a pressure oil from a hydraulic pump directly driven by the engine is supplied to a hydraulic circuit for a lift arm cylinder for raising and lowering the attached working implement.

BACKGROUND ART

Generally a hydraulic stepless change speed apparatus (Hydrostatic power transmission) used in a tractor includes a charge oil line to maintain a full supply of actuating oil in this apparatus, and pressure oil is fed thereto from a charge pump. According to the prior art, this charge pump is attached to the hydraulic stepless change speed apparatus and, when the main clutch is put out, the charge pump is brought out of operation stopping the pressure oil supply for charging. Therefore, the supply of pressure oil for charging is interrupted while the main clutch is put out in order to effect a gear change to the gear transmission or stop operation of the working implement, and the main clutch is frequently put out depending on the type of gear changing or working implement which, although temporarily, results in a loss in transmission efficiency due to shortage of the pressure oil for charging.

Further, tractors are sometimes equipped with means to retain the main clutch disengaged in order to prevent transmission faces of the main clutch from sticking to each other by rusting or the like during a long period of nonuse. With the main clutch so kept disengaged, even if the engine is started, the hydraulic stepless change speed apparatus is not filled with the charge oil and this change speed apparatus cannot be driven properly without waiting for a while after putting in the clutch. In this case, since the vehicle starts moving upon putting in the main clutch although the drive is uncertain, the driver generally confirms prior to putting in the main clutch that the change speed operating device is in neutral in order to prevent the vehicle from inadvertently moving, and thereafter puts in the main clutch, wherefore it tends to take a long time from the start of the engine till the start of the vehicle with the hydraulic stepless change speed apparatus working properly.

As one means of shortening the preparation time for driving the hydraulic stepless change speed apparatus, it has been devised, for example, to increase the capacity of the charge pump and at the same time use a specially provided accumulator so that charging is effected in a short time after the main clutch is put in, or to provide an additional charge pump on the engine side so that charging starts simultaneously with the start of the engine, but then the construction becomes complicated and besides the apparatus space for obtaining a charge oil pressure source becomes large, making it hardly applicable to small tractors.

The object of the present invention is to provide for supply of charge pressure oil to the hydraulic stepless change speed apparatus to be carried out reliably at all times and prevent the occurrence of inconvenience as noted above, by a hydraulic circuit reconstruction to effectively utilize the existing hydraulic pump for supplying pressure oil to the hydraulic circuit for the lift arm cylinder for raising and lowering the attached working implement.

DISCLOSURE OF INVENTION

To be particular, the present invention is characterized by the feature that the hydraulic circuit for driving the lift arm cylinder for raising and lowering the working implement, which receives a supply of pressure oil from the hydraulic pump directly driven by the engine, has a return oil line connected to a charge oil line for the hydraulic stepless change speed apparatus. According to this, while the engine is running the hydraulic pump is also driven, and therefore the charge pressure oil can be supplied to the hydraulic stepless change speed apparatus regardless of whether the main clutch is engaged or disengaged, thereby avoiding the loss in transmission efficiency due to the shortage of the charge pressure oil occurring when the main clutch is put out to effect gear changing or to stop the working implement, and at the same time enabling the hydraulic stepless change speed apparatus to operate properly after a certain short time only if the engine starts.

Furthermore, in order to achieve the foregoing object also where a single acting hydraulic cylinder is used as the lift arm cylinder for raising and lowering the working implement, the present invention arranges that the pressure oil from the hydraulic pump is supplied to a flow priority valve to divide the same into a constant amount of control flow and an excess flow, the excess flow being supplied to the hydraulic circuit for driving the lift arm cylinder, and the constant amount of control flow being joined into the return oil line from the hydraulic circuit for driving the lift arm cylinder, with this return oil line connected to the charge oil line. According to this, while the pressure oil is supplied to the single acting hydraulic cylinder, there is no return oil from the hydraulic circuit for this cylinder, but at least the constant amount of control flow is fed to the charge oil line and the supply of charge oil pressure never stops completely thereby to enable the hydraulic stepless change speed apparatus to operate excellently at all times.

BRIEF DESCRIPTION OF DRAWINGS

FIGS. 5 through 10 show a pressure oil distributor unit, FIG. 5 being a cross-sectional plan view, FIG. 6 being a sectional view taken on line VI—VI in FIG. 5, FIG. 7 being a sectional view taken on line VII—VII in FIG. 6, FIG. 8 being a sectional view taken on line VIII—VIII in FIG. 5, FIG. 9 being a sectional view taken on line IX—IX in FIG. 5, and FIG. 10 being a sectional view taken on line X—X in FIG. 5, further.

BEST MODE FOR CARRYING OUT THE INVENTION

In order to describe the present invention more particularly, explanation is given hereinafter with reference to the accompanying drawings.

Figure 1:
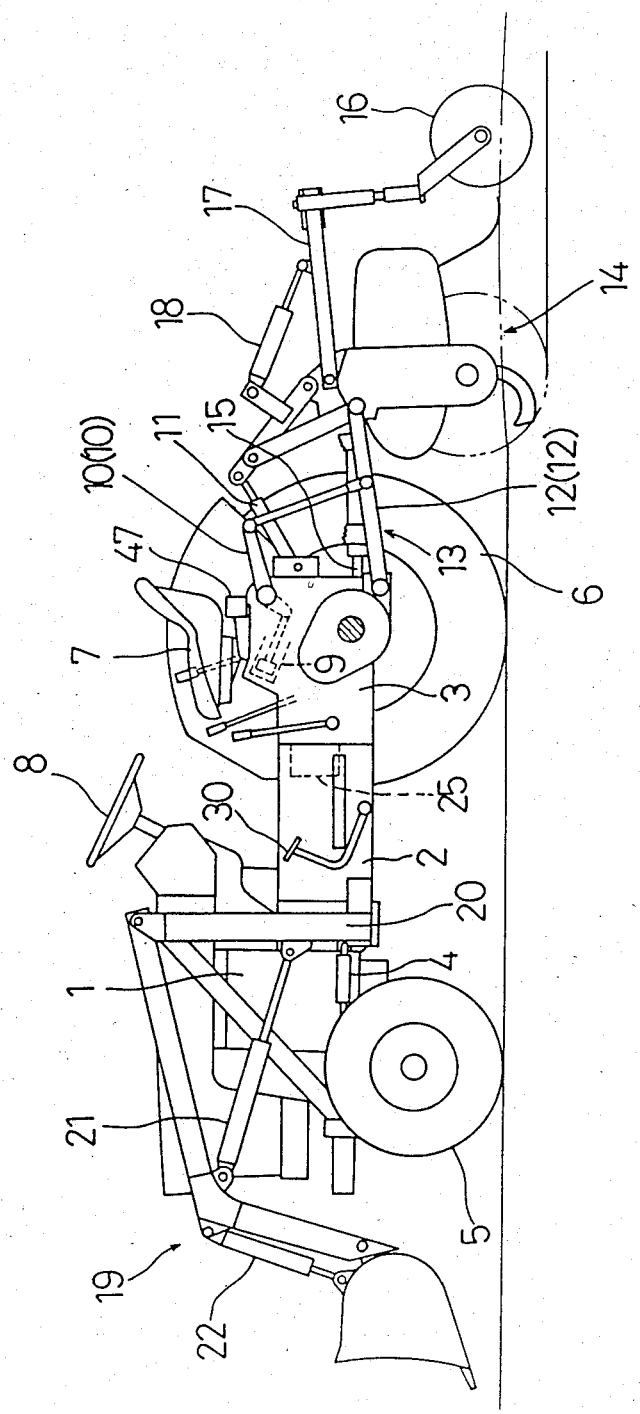
FIG. 1 is a side view of an entire agricultural tractor incorporating a hydralic circuit construction according to the present invention.

The agricultural tractor shown in FIG. 1 has a construction including an engine (1), a clutch housing (2) and a gear transmission case (3) directly interconnected in a backward and forward direction to form a body frame which is equipped with front drive wheels (5),(5) dirigible by a booster type power steering cylinder (4) and rear drive wheels (6),(6), the construction further including a seat (7) disposed upwardly of a rear portion of the gear transmission case (3), a steering wheel (8) disposed forwardly thereof, and lift arms (10),(10) at the rear of the case to be vertically oscillatable by a single acting hydraulic cylinder (9).

A rotary plow (14) which is an example of attached working implement is connected to a rear portion of this tractor through a three point link mechanism (13) comprising a top link (11) and lower links (12),(12), this three point link mechanism (13) being supported by the lift arms (10),(10) to raise and lower the plow (14). This plow (14) is driven by power from a rear PTO shaft (15) projecting from a rear end of the tractor.

The top link comprises a double acting hydraulic cylinder adapted to adjust, by expansion and contraction, a forward/rearward inclination of the plow (14). Further, a frame (17) supporting a tail wheel (16) is pivotally connected at a forward end thereof to a top portion of the plow (14) to be vertically oscilatable, and this frame (17) is oscillatably adjustable by a double acting hydraulic cylinder (18) for use in adjusting a plowing depth which is carried out by setting the height of the tail wheel (16), while placing the rotary plow (14) in free suspension.

Further, a front loader (19) may be removably attached as desired to the front of the tractor through a support frame (20), and this shovel implement (19) is equipped with a lift cylinder (21) and a tilt cylinder (22).

Figure 2:
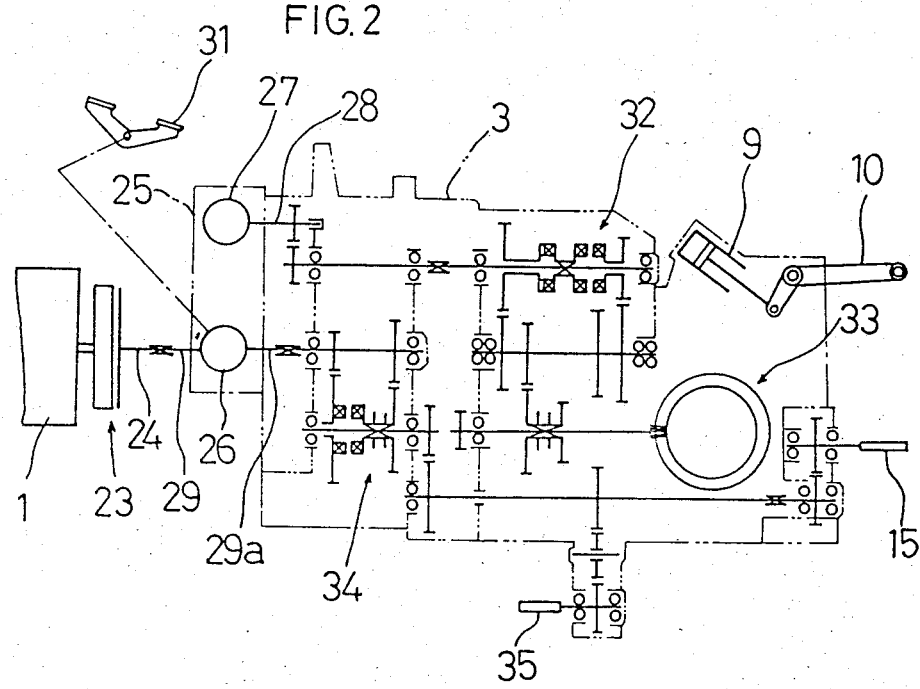
FIG. 2 is a schematic side view showing a transmission system.

Next, a transmission system for the above tractor is described with reference to FIG. 2.

Output of the engine (1) is transmitted through a main clutch (23) and a main transmission shaft (24) to a hydraulic stepless change speed apparatus (25). This change speed apparatus (25) is attached to a front face of the gear transmission case (3), and includes a variable volume pump (26) in a lower portion thereof and an output motor (27) in an upper portion thereof. A motor output shaft (28) is provided to project into the transmission case (3), and a pump drive shaft (29) connected to the main transmission shaft (24) extends rearwardly with a rearwardly extending portion (29a) thereof projecting into the transmission case.

The main clutch (23) is put out by depressing a main clutch pedal (30) provided at a left side of the clutch housing (2), and the pump (26) of the hydraulic change speed apparatus (25) is operated by a change speed pedal (31) provided at a right side of the clutch housing (2) to be adjustable to provide stepless forward speeds by forwardly depressing the pedal (31) and stepless backward speeds by rearwardly depressing the same, and to return to neutral upon release of the pedal.

The output shaft (28) of the motor (27) which is forwardly and backwardly rotated and accelerated and decelerated according to pressure oil dispensing direction and dispensing amount of the pump (26) is transmitted to a traveling gear transmission (32) inside the transmission case (3), where a four step auxiliary change speed is effected, and is thereafter transmitted to a differential (33) for driving the rear wheels. Although not illustrated, varied speed drive after passing through this transmission (32) is also transmitted by shaft means to the front wheels (5).

The rearwardly extending portion (29a) of the pump drive shaft (29) is operatively connected to the rear PTO shaft (15) through a gear transmission (34) capable of a two step change speed operation, and this transmission line from an intermediate part of power may be branched off for an intermediate PTO shaft (35) as desired.

It is to be noted that the main clutch (23) is put out at times of gear changing for the gear transmission (32) in the traveling system and the gear transmission (34) in the PTO system.

Figure 3:
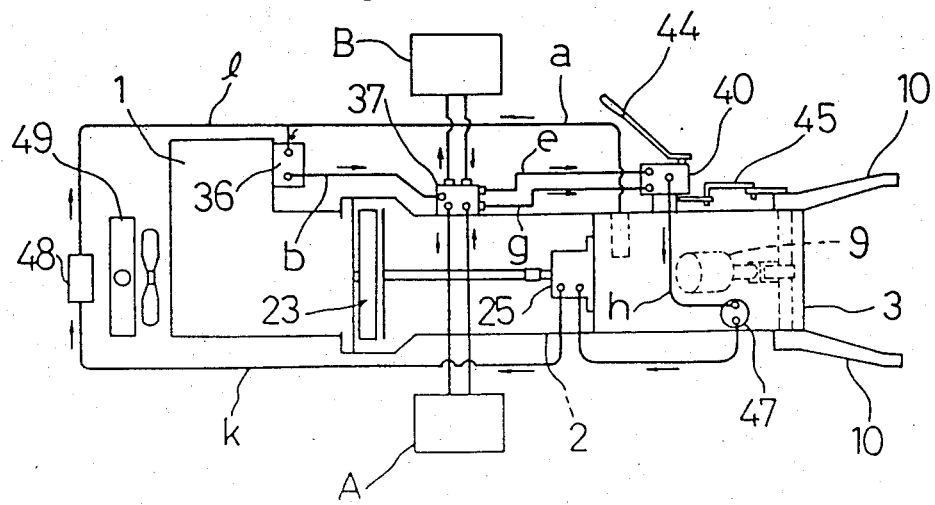
FIG. 3 is a schematic plan view showing a hydraulic piping system.

Next, a hydraulic circuit construction for the lift arm actuating hydraulic cylinder (hereinafter referred to as lift arm cylinder) (9) and other hydraulic mechanisms is described with reference to FIGS. 3 and 4.

A hydraulic pump (36) is directly attached to a lateral side (generally a gear case portion) of the engine (1), and a suction oil line (a) (piping) thereof is connected to the gear transmission case (3) to draw in gear lubricating oil as an actuating oil. A discharge oil line (b) (piping) of the pump (36) is connected to an input port (P) of a pressure oil distributor unit (37) attached to a lateral face of the clutch housing (2).

This pressure oil distributor unit (37) includes a flow priority valve (38) to drive oil dispensed from the pump (36) into a constant amount of control flow (Q1) and a remaining excess flow (Q2), and a hydraulic circuit (A) for controlling the power steering cylinder (4) is connected to a first output port (P1) and a return port (P2) for the control flow (Q1), the control flow (Q1) returning therefrom being sent out again from a second output port (P3).

Figure 4:
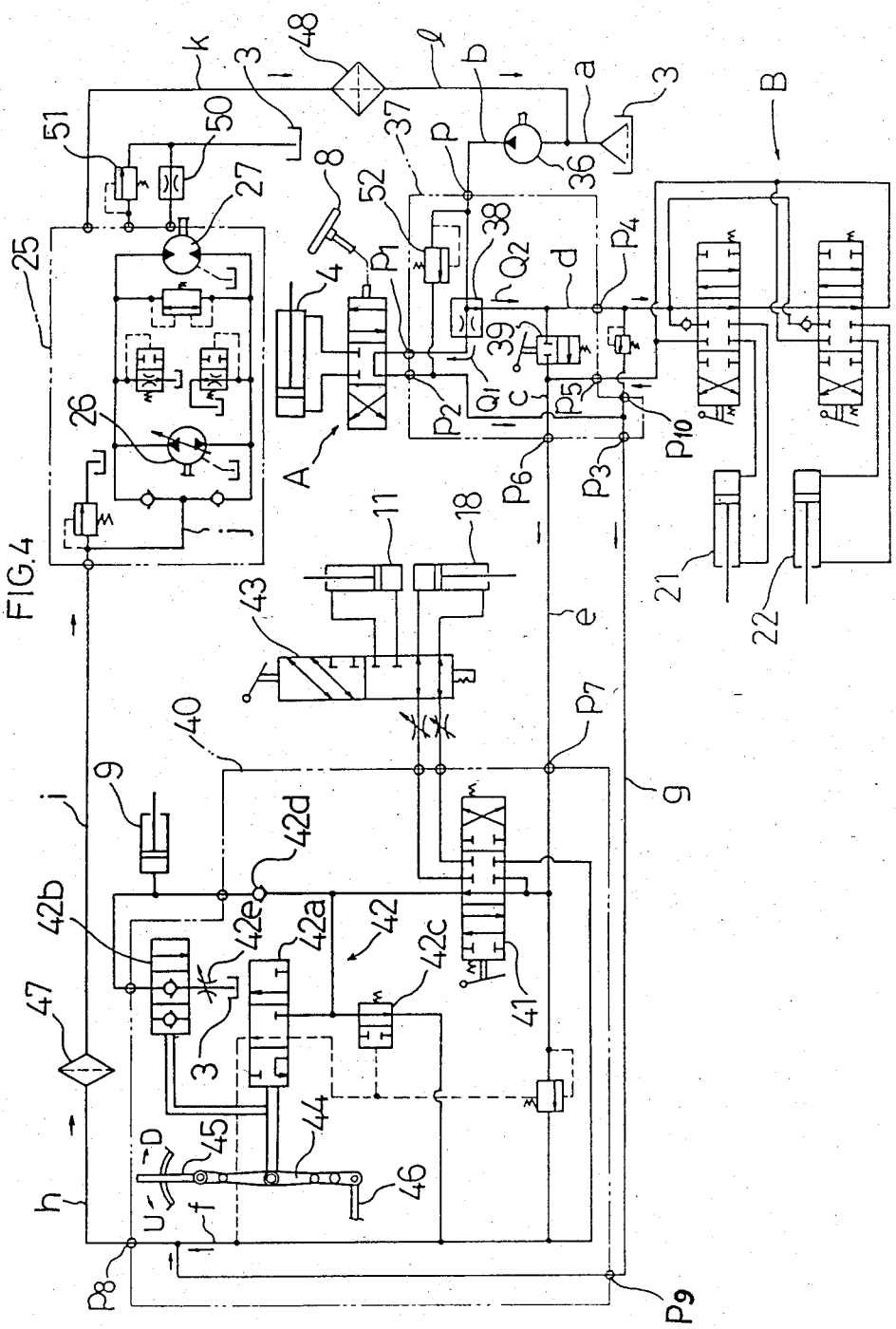
FIG. 4 is a view of a hydraulic circuit arrangement.
Figure 9:
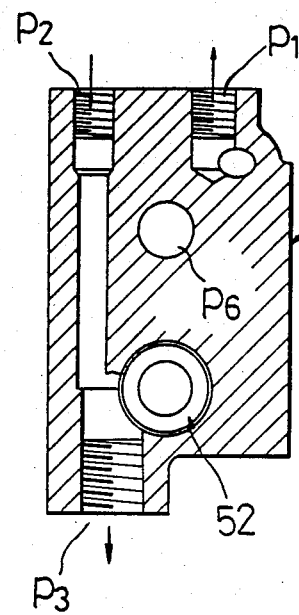
Figure 10:
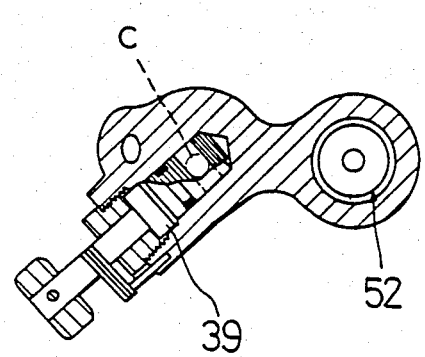

The excess flow (Q2) is feedable to a branch oil line (c) having an on-off valve (39) and a further branch oil line (d) and when the front loader (19) is mounted, as shown in FIG. 4, the valve (39) is closed to send the excess flow to the branch oil line (d) and a front loader driving hydraulic circuit (B) is connected to a third output port (P4) of the branch oil line (d) and a return port (P5) thereof. The return oil from this return port (P5) is sent into the other branch oil line (c) inside the unit and is taken out via a fourth output port (P6). When the front loader is removed, the valve (39) is opened and the output port (P4) and the return port (P5) are closed with plugs.

Regardless of the pressure of the front loader (19), a whole amount of excess flow (Q2) is taken out via the fourth port (P6) into an outside oil line (e) (piping). This oil line (e) is connected to a first input port (P7) of a control valve unit (40) attached to a right side of the transmission case (3).

This control valve unit (40) includes, connected in series, a directional control valve (41) for the double acting top link cylinder (11) and the double acting hydraulic cylinder (18) for raising and lowering the tail wheel frame (17) and a position control valve (42) for the lift arm cylinder (9). Selective use of the top link cylinder (11) and the tail wheel raising and lowering hydraulic cylinder (18) is carried out by a selecting operation of a flow line switch valve (43) provided specially.

The position control valve (42) for the lift arm cylinder comprises an externally operable main spool (42a), a poppet valve (42b) movable in unison therewith, an unload valve (42c) and a check valve (42d). When the main spool (42a) is placed in a neutral position as shown in FIG. 4, pressure oil flowing from the input port (P7) is discharged from the unload valve (42c) and the check valve (42d) is closed by an internal pressure of the cylinder (9) thereby locking the lift arm (9). When the main spool (42a) is shifted rightward in the drawing, the unload valve (42c) is closed by a feed pressure and the check valve (42d) is opened by the feed pressure to supply the pressure oil to the cylinder (9) thereby actuating the lift arm (10) upwardly. When the main spool (42a) is shifted leftward in the drawing, the unload valve (42c) acts to discharge the supplied pressure oil and the poppet valve (42b) is opened, whereby oil discharged from the cylinder (9) is returned directly to the transmission case (3) through an orifice (42e) and the lift arm (10) slowly lowers by gravity.

The main spool (42a) is connected to a pivotal point of a spool operator lever (44) which is oscillatable in seesaw motion, the spool operator lever (44) being linked at one end thereof with a position control lever (45) and at the other end with a feedback link (46) which is linked with the lift arm (10). To describe the construction more particularly, when the position control lever (45) is oscillated to an upward side (U) or a downward side (D) to move the one end of the spool operator lever (44) and thereby to shift the main spool (42a) forward or reverse, the resulting upward or downward movement of the lift arm (10) causes the feedback link (46) to move the other end of the spool operator lever (44) in a direction opposite to the direction of movement of the one end thereby returning the main spool (42a) relatively toward neutral, whereby the lift arm (10) moves upward or downward and stops at a position corresponding to a control position of the position control lever (45).

It is to be noted that the control valve unit (40) and the lift arm cylinder (9) are interconnected by oil lines within the case.

Return oils from the respective components of the control valve unit (40) are collected into a single return oil line (f) and taken out from a fifth output port (P8). The oil from the second output port (P3) of the distributor unit (37), or the constant amount of control flow (Q1), is fed through an oil line (piping) (g) to a second input port (P9) of the control valve unit (40) and is put into confluence in the return oil line (f) within the unit. The confluent oil is taken out from the second output port (P8) and through an oil line (piping) (h) and fed to a filter (47) mounted on top of the transmission case (3). The pressure oil cleaned here is supplied further through an oil line (piping) (i) to the hydraulic stepless change speed apparatus (25) and fed into a charge oil line (j) defined in its interior.

Further, drain oil remaining in the interior of the hydraulic stepless change speed apparatus (25) is sent through an oil line (piping) (k) to an oil cooler (48) at the front end of the tractor body to be cooled by utilizing cooling air for an engine radiator (49), the cooled oil being further sent through an oil line (piping) (1) into the suction oil line (a) of the hydraulic pump (36).

The hydraulic stepless change speed apparatus (25) is provided with an orifice (50) to return the inner drain oil to the transmission case (3) while securing a sufficient pressure to send out the oil to the oil cooler (48), and a relief valve (51) operable when the internal pressure of the apparatus unduly rises.

Figure 11:
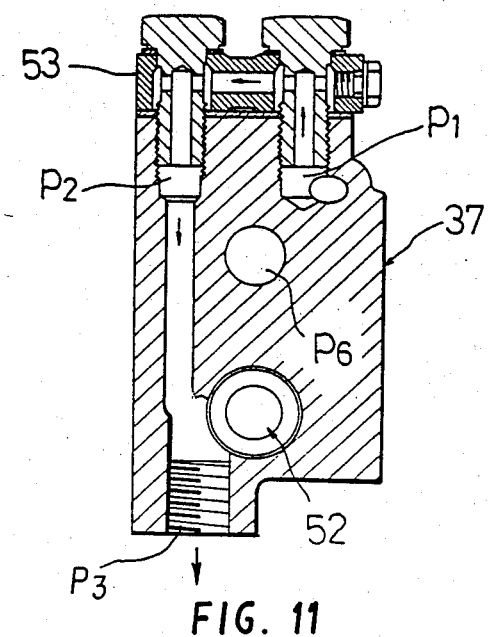
FIG. 11 is a sectional view corresponding to FIG. 9 and in a different mode of use.

A specific construction of the pressure oil distributor unit (37) is shown in FIGS. 5 through 10. Here, in the drawings, reference (52) is a main relief valve, and (P10) is a return port for relief oil from the hydraulic circuit (B) for the front loader. Further, when the hydraulic circuit (A) for the power steering is not utilized, the first output port (P1) and the return port (P2) thereof are placed in communication by an adapter (53) as shown in FIG. 11.

INDUSTRIAL APPLICABILITY

In a mode where a single acting hydraulic cylinder is utilized as the lift arm cylinder and an excess flow from the flow priority valve is supplied to the hydraulic circuit for driving the lift arm cylinder, a constant amount of control flow may be used for a hydraulic circuit which requires a constant speed drive, such as a circuit for power steering and a hydraulic circuit for automatically controlling the posture or position of a working implement.

I claim:

1. A hydraulic circuit construction for a tractor comprising:
   a hydraulic stepless change speed means adapted to be driven by an engine through a main clutch and including a charge oil line;
   a hydraulic pump adapted to be directly driven by the engine;
   a single-acting hydraulic cylinder for operating a work implement;
   flow priority valve means to divide pressure oil from the hydraulic pump into a control flow line and an excess flow line,
   both the control flow line and the excess flow line being parallel-connected to the charge oil line, the control flow line joining an oil line leading to the charge oil line for passing pressure oil to the hydraulic stepless change-speed means; and
   control circuit means disposed in said excess flow line for controllably regulating pressure oil flow to said single-acting hydraulic cylinder and having at least one oil line for passing therethrough unregulated flow of the pressure oil into the charge oil line.

2. The construction of claim 1 wherein said control circuit means includes position control valve means and swingable lever means operatively connected to said position control valve means for operating said valve means to regulate pressure oil flow to the single-acting hydraulic cylinder from the excess flow line.

3. The circuit construction of claim 2 wherein said swingable lever means has one end portion linked to a hand lever for position selection of said position control valve means.

4. The circuit construction of claim 3 wherein a change speed output of the hydraulic stepless change speed means is transmitted to a gear transmission for traveling, and wherein the engine output, having passed the main clutch, is transmittable to a shaft for activating a working implement without passing through the hydraulic stepless change speed means.

5. The circuit construction of claim 1 wherein said excess flow line includes a directional control valve hydraulically connected to a double-acting hydraulic cylinder.

* * * * *